US006987895B2

(12) United States Patent
Johannessen

(10) Patent No.: US 6,987,895 B2
(45) Date of Patent: Jan. 17, 2006

(54) THERMAL COMPENSATION OF WAVEGUIDES BY DUAL MATERIAL CORE HAVING POSITIVE THERMO-OPTIC COEFFICIENT INNER CORE

(75) Inventor: Kjetil Johannessen, Trondheim (NO)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 10/190,411

(22) Filed: Jul. 2, 2002

(65) Prior Publication Data

US 2004/0005133 A1 Jan. 8, 2004

(51) Int. Cl.
*G02F 1/295* (2006.01)

(52) U.S. Cl. ............................... 385/8; 385/14; 385/16; 385/17; 385/27; 385/40; 385/129

(58) Field of Classification Search ..................... 385/3, 385/18, 16, 40–45, 123–130, 144–147, 14, 385/12
See application file for complete search history.

(56) References Cited

U.S. PATENT DOCUMENTS

| | | | | |
|---|---|---|---|---|
| 5,125,946 A | | 6/1992 | Bhagavatula | |
| 5,163,118 A | | 11/1992 | Lorenzo et al. | |
| 5,857,039 A | | 1/1999 | Bosc et al. | |
| 6,002,823 A | * | 12/1999 | Chandross et al. | 385/50 |
| 6,083,843 A | * | 7/2000 | Ohja et al. | 438/710 |
| 6,118,909 A | | 9/2000 | Chen et al. | |
| 6,122,416 A | | 9/2000 | Ooba et al. | |
| 6,144,779 A | | 11/2000 | Binkley et al. | |
| 6,240,226 B1 | * | 5/2001 | Presby et al. | 385/42 |
| 6,310,999 B1 | * | 10/2001 | Marcuse et al. | 385/42 |
| 6,311,004 B1 | * | 10/2001 | Kenney et al. | 385/130 |
| 6,333,807 B1 | | 12/2001 | Hatayama et al. | |
| 6,389,209 B1 | | 5/2002 | Suhir | |
| 6,535,672 B1 | | 3/2003 | Paiam | |
| 6,704,487 B2 | * | 3/2004 | Parhami et al. | 385/129 |

FOREIGN PATENT DOCUMENTS

| | | |
|---|---|---|
| EP | 1 026 526 | 8/2000 |
| WO | PCT/US 03/17136 | 7/2002 |
| WO | PCT/US 03/171180 | 5/2003 |

OTHER PUBLICATIONS

Y. Kokubum, et al., "Athermal Narrow–Based Optical Filter at 1.55um Wavelength by Silica–Based Athermal Waveguide", IEICE Trans. Electron., vol. E81–C, No. 8, Aug. 1998, pp. 1187–1194.

Y. Kokubum, et al., "Three–dimensional athermal waveguides for temperature independent lightwave devices", Electronics letters, Jul. 21, 1994, vol. 30, No. 15, pp. 1223–1224.

* cited by examiner

*Primary Examiner*—John R. Lee
*Assistant Examiner*—David A. Vanore
(74) *Attorney, Agent, or Firm*—Kevin A. Reif

(57) ABSTRACT

A planar lightwave circuit comprises a waveguide that is thermally-compensating. The waveguide comprises a cladding and a core that comprises two regions running lengthwise through the core. One region has a negative thermo-optic coefficient; the other region has a positive thermo-optic coefficient.

25 Claims, 8 Drawing Sheets

THERMAL COMPENSATION OF WAVEGUIDES BY DUAL MATERIAL CORE HAVING POSITIVE THERMO-OPTIC COEFFICIENT INNER CORE

RELATED APPLICATIONS

This application is related to co-pending application, filed Jul. 2, 2002, entitled "THERMAL COMPENSATION OF WAVEGUIDES BY DUAL MATERIAL CORE HAVING NEGATIVE THERMO-OPTIC COEFFICIENT INNER CORE," and assigned to the Assignee of the present application.

BACKGROUND OF THE INVENTION

1. Field of the Invention

The described invention relates to the field of optical circuits. In particular, the invention relates to thermal compensation in an optical waveguide.

2. Description of Related Art

Optical circuits include, but are not limited to, light sources, detectors and/or waveguides that provide such functions as splitting, coupling, combining, multiplexing, demultiplexing, and switching. Planar lightwave circuits (PLCs) are optical circuits that are manufactured and operate in the plane of a wafer. PLC technology is advantageous because it can be used to form many different types of optical devices, such as array waveguide grating (AWG) filters, optical add/drop (de)multiplexers, optical switches, monolithic, as well as hybrid opto-electronic integrated devices. Such devices formed with optical fibers would typically be much larger or would not be feasible at all. Further, PLC structures may be mass produced on a silicon wafer.

PLCs often have been based on silica-on-silicon (SOS) technology, but may alternatively be implemented using other technologies such as, but not limited to, silicon-on-insulator (SOI), polymer on silicon, and so forth.

Thermal compensation for some optical circuits, such as phase-sensitive optical circuits, is important as devices may be operated in locations where temperatures cannot be assured. In some cases, optical circuits are combined with temperature regulating equipment. However, these configurations may be less than ideal, since the devices are prone to failure if there is a power outage, and temperature regulating equipment may require a large amount of power which may not be desirable.

DETAILED DESCRIPTION

A planar lightwave circuit comprises one or more waveguides that are thermally-compensating. The thermally-compensating waveguides comprise a cladding and a core that comprises two regions running lengthwise through the core. One region has a negative thermo-optic coefficient ("TOC"); the other region has a positive TOC.

Figure 1A:
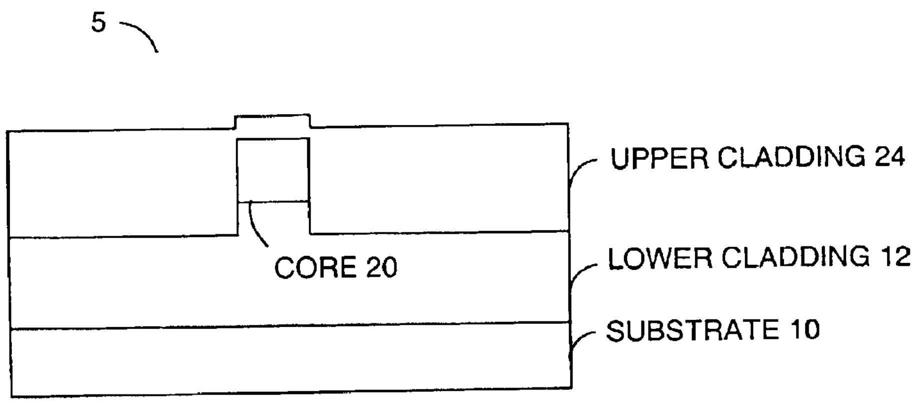
FIGS. 1A–1C are schematic diagrams showing one embodiment of a cross-sectional view of a waveguide structure being modified to be thermally-compensating.

FIG. 1A is a schematic diagram showing one embodiment of a cross-sectional view of a waveguide structure 5. In one embodiment, the structure is subsequently modified as described with respect to FIGS. 1B and 1C to be thermally-compensating.

As shown in FIG. 1A, a layer of lower cladding 12 is typically deposited onto a substrate 10. A waveguide core layer 20 is deposited over the lower cladding 12, and an upper cladding 24 is deposited over the waveguide core layer 20. In one example, the substrate 10 is silicon, the lower cladding 12 is $SiO_2$, the core layer 20 is $SiO_2$ doped with Germanium, and the upper cladding 24 is a borophosphosilicate glass (BPSG). In one embodiment, the upper cladding 24 may form a thin layer of approximately 1–2 microns covering the core.

Figure 1B:
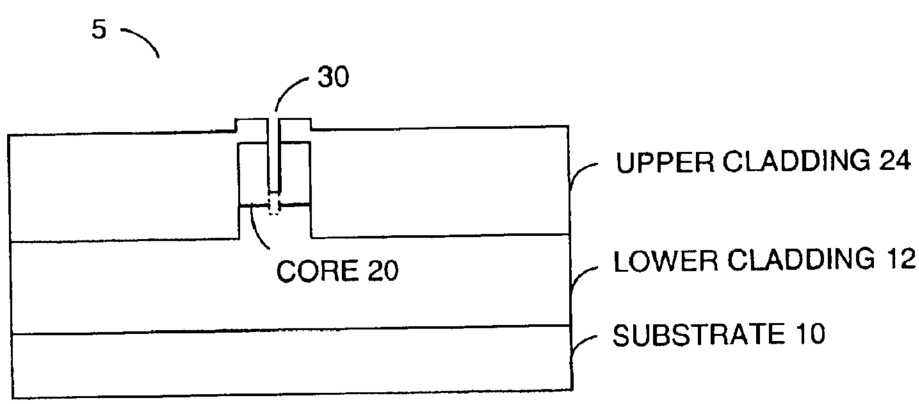

FIG. 1B is a schematic diagram showing one embodiment of a cross-section view of a waveguide after a trench 30 is created in the core layer 20. In one embodiment, the trench 30 is formed to run along a length of the core of the waveguide. The trench may be formed by etching, ion beam milling, or other methods. In one embodiment, the trench has a depth of at least ⅔ of the depth of the core. However, the trench depth may extend down into the lower cladding 12. The width of the trench is designed to be less than a wavelength of the optical signal to be propagated by the waveguide.

Figure 1C:
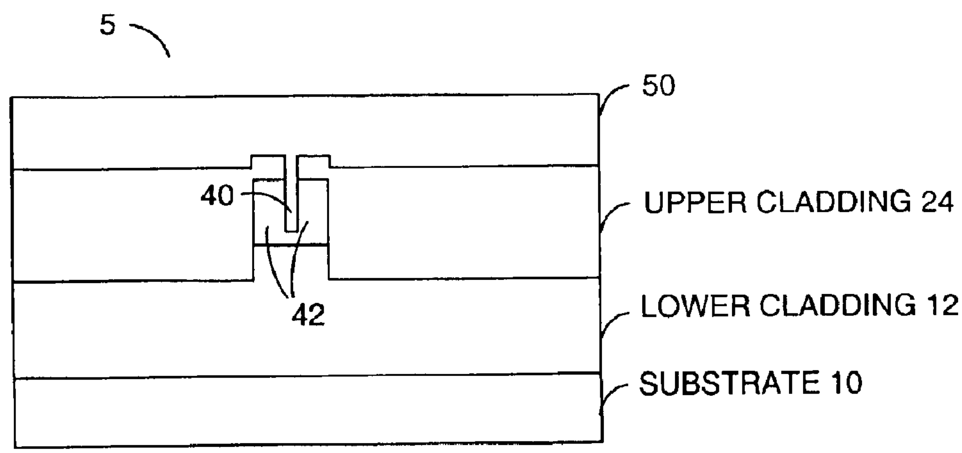

FIG. 1C is a schematic diagram showing one embodiment of a cross-sectional view of FIG. 1B after a layer of material 50 having a negative TOC has been deposited. The negative TOC material 50 fills the trench to form a negative TOC center region 40 of the core. In one embodiment, a polymer, such as silicone, poly(methylmethacrylate) ("PMMA"), or benzocyclobutene ("BCB"), is used. However, various other materials may alternatively be used.

When an optical signal propagates within the waveguide 5, a first portion of the optical field of the optical signal propagates in the negative TOC region 40, and a second portion of the optical field propagates in the positive TOC region 42 of the core. In one embodiment, the first portion of the optical field in the negative TOC region 40 is substantially surrounded by the second portion of the optical field in the positive TOC region 42.

In one embodiment, the refractive index difference between the negative TOC region 40 and the positive TOC region 42 is large enough to allow filling over the negative TOC region 40 with a layer of the same material that serves as an upper cladding. The structure described provides good compensation with low loss over a wide temperature range, and allows for convenient fabrication.

Figure 2:
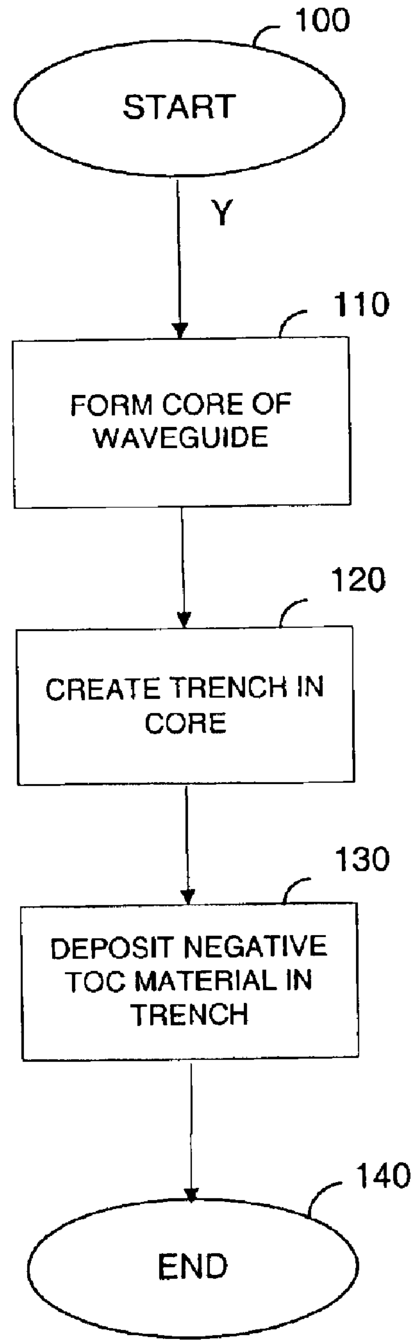
FIG. 2 is a flowchart showing one embodiment of a method for fabricating a thermally-compensating waveguide.

FIG. 2 is a flowchart showing one embodiment of a method for fabricating a thermally-compensating waveguide. The flowchart starts at block 100, and continues with block 110, at which a core of the waveguide is formed over an appropriate substrate structure. In one embodiment, the core is formed on a SOS structure and comprises $SiO_2$ doped with Germanium having a cross-sectional area of approximately 6 microns by 6 microns. Other positive TOC materials may alternatively be used. The flowchart continues at block 120 at which a trench is created in the core. In one embodiment, the trench is approximately 1 micron wide and runs an entire length of the waveguide. At block 130, a negative thermo-optic coefficient material is deposited into the trench. In one embodiment, an optical signal of approximately 1550 nm propagates within both the materials making up the core, having both positive and negative TOC regions. The flowchart ends at block 140.

In an alternate embodiment, after the trench is filled with the negative TOC material, another material having a positive TOC may be used to cover the negative TOC material.

The effective index of propagation in the core will have a close to linear response to compensate for the thermal expansion of the substrate, and allows for thermal compensation up to a range of approximately 100° C. Additionally, the described waveguide structure may be used for curved waveguides. A bend radius of down to 10 mm is achievable with losses on the order of approximately 0.3 db/cm.

Figure 3:
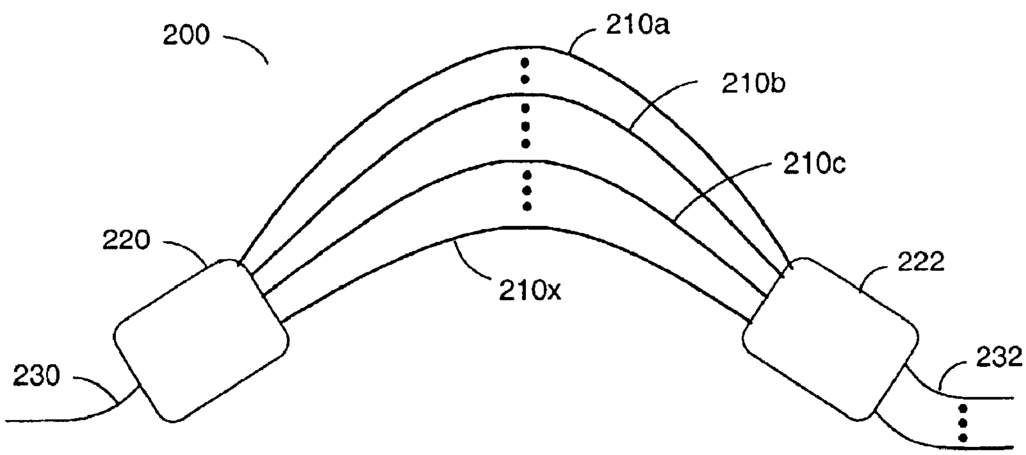
FIG. 3 is a schematic diagram showing one embodiment of an array waveguide grating (AWG) that makes use of the thermally-compensating waveguides.

FIG. 3 is a schematic diagram showing one embodiment of an array waveguide grating (AWG) 200 that makes use of thermally-compensating waveguides. In one embodiment, the waveguides 210*a*–210*x* are thermally-compensating as previously described, but the star couplers 220 and 222 and the input and output waveguides 230 and 232 are not thermally-compensated, allowing for easier alignment of the input and output waveguides 230 and 232 with other optical components.

Figure 4:
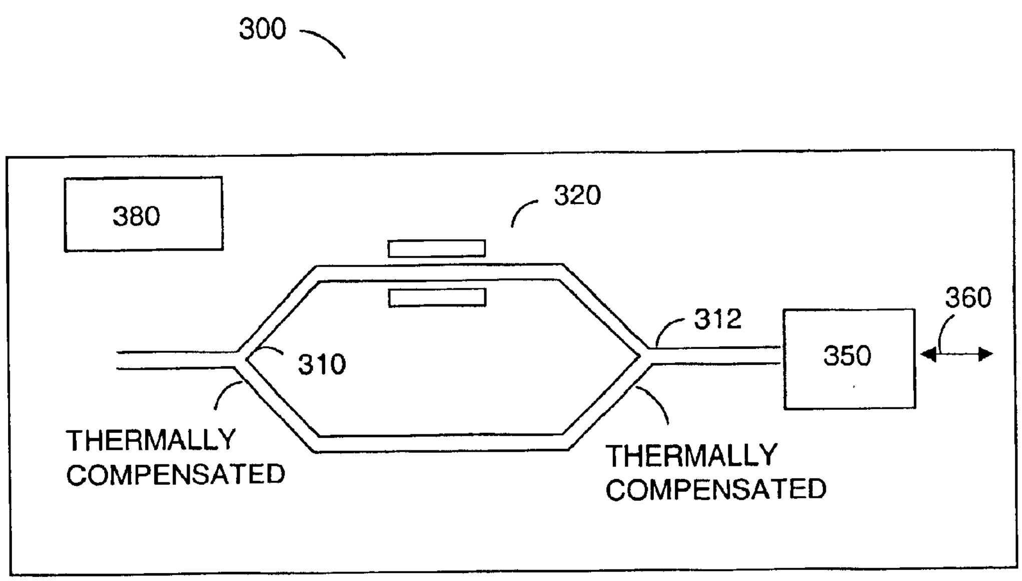
FIG. 4 is a schematic diagram showing an embodiment of a PLC comprising an interferometric component that uses thermally-compensating waveguides in its coupler regions.

FIG. 4 is a schematic diagram showing an embodiment of a PLC comprising an interferometric component 300 that uses thermally-compensating waveguides in coupler regions 310 and 312. A temperature regulator 320 is used on a non-thermally-compensated waveguide portion to modify the phase of the optical signal. In one embodiment, an electrical component 350, such as an optical-to-electrical converter and/or electrical-to-optical converter, is coupled to the thermally-compensated waveguide coupler 312. One or more electrical connections 360 couple the electrical component 350 with power and other electrical signals. In an alternate embodiment, the phase modulation may be adjusted using other methods, such as mechanical.

In one embodiment, a temperature regulator 380 may be housed with a thermally-compensated optical circuit to keep the device within its thermally-compensating temperature range.

The thermally-compensating waveguides described compensate single mode waveguides independently. They may be used solely in a phase-sensitive portion or throughout an optical circuit.

A variety of different materials may be used for the thermal-compensation. For example, silicone has a TOC of −39x10−5/° C., PMMA has a TOC of −9x10−5/° C., and BPSG has a TOC of approximately 1.2x10−5/° C. The design of the trench may be altered to compensate for the use of various materials.

Figure 5:
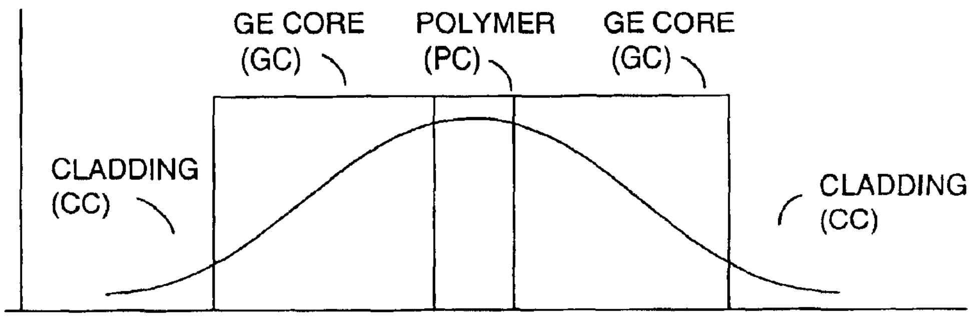
FIG. 5 is a graph illustrating the normalized mode field intensity in a cross section of a dual material waveguide.
Figure 6:
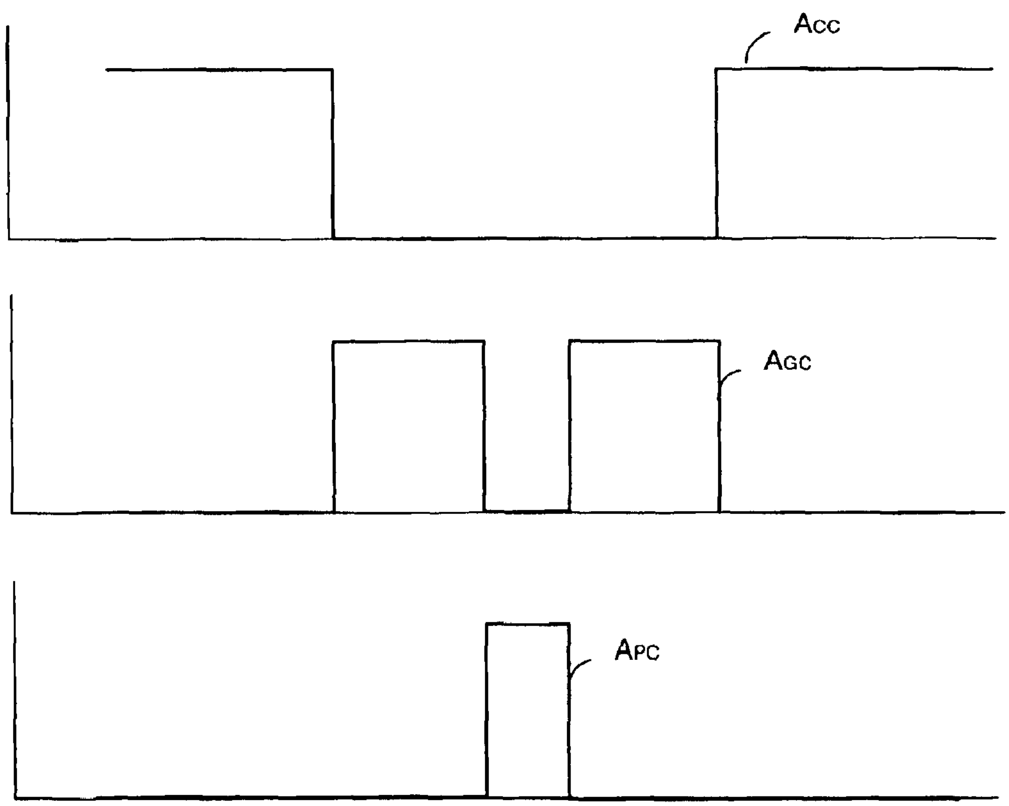
FIG. 6 is a graph illustrating an aperture function for a dual material waveguide.

FIG. 5 is a graph illustrating the normalized mode field intensity in a cross section of a dual material waveguide. FIG. 6 is a graph illustrating an aperture function for a dual material waveguide. In one approximation, the waveguide materials are chosen to satisfy the following relation:

$$\int \Psi A_{PC} \Psi^* \cdot B_{PC} + \int \Psi A_{GC} \Psi^* \cdot B_{GC} + \int \Psi A_{CL} \Psi^* \cdot B_{CL} = -n\alpha_{substrate}$$

wherein $\Psi$ is the mode field intensity;

$\Psi^*$ is the complex conjugate of the mode field intensity;

$\alpha$ is the linear thermal expansion coefficient, which is dominated by the substrate;

B is the thermo-optic coefficient;

n is the effective index of propagation; and

A is an aperture function having the value 1 within the material and 0 outside the material, and wherein the subscript PC indicates within the polymer core, GC indicates within the Ge Silica core, and CL indicates within the cladding.

For those skilled in the art, it is relatively straight-forward to include effects of strain and polarization to improve the accuracy of the modeling.

Figure 7A:
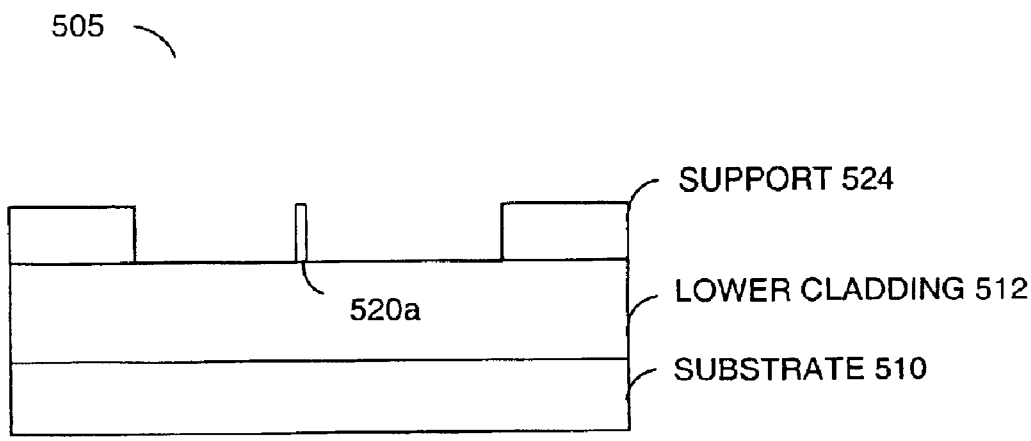
FIGS. 7A–7C are schematic diagrams that illustrate another embodiment of a thermally compensated waveguide.
Figure 7B:
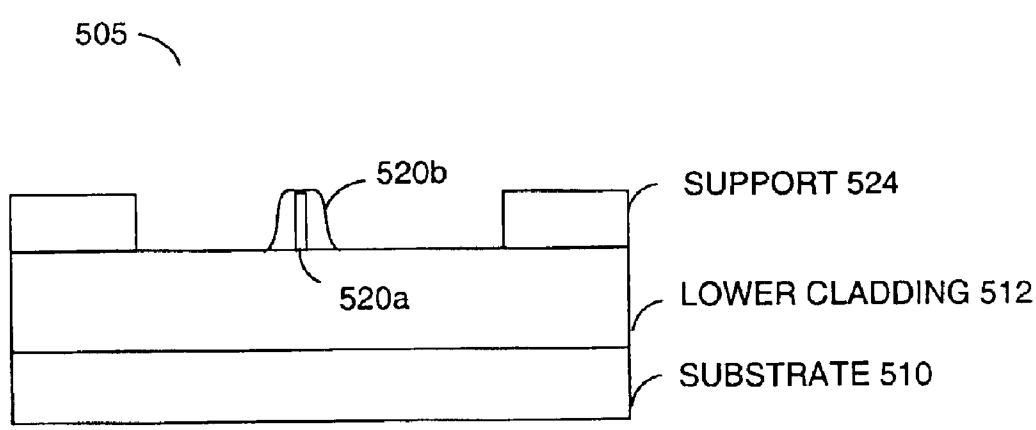
Figure 7C:
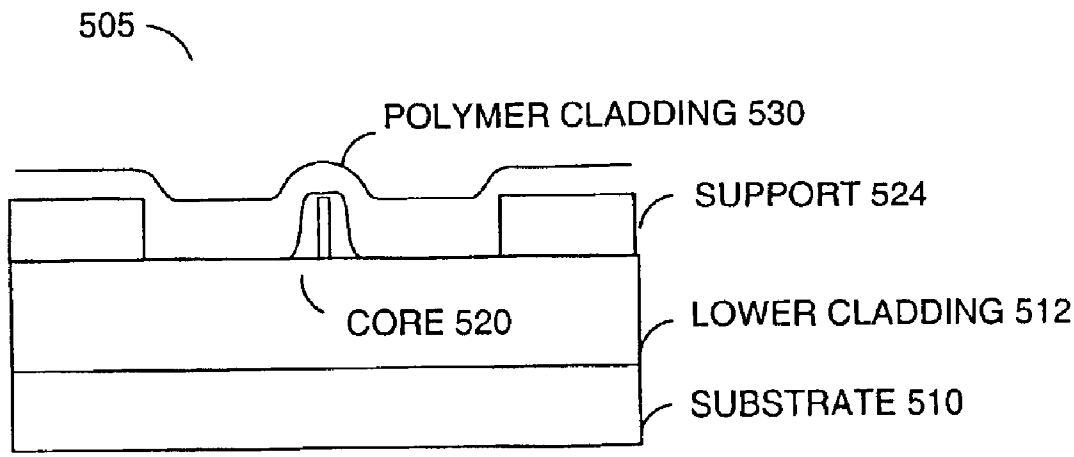

FIGS. 7A–7C are schematic diagrams that illustrate another embodiment of a thermally compensated waveguide 505. In this embodiment, the core 520 has a central portion that has a positive TOC and an outer portion that has a negative TOC.

FIG. 7A shows a first core portion 520*a* having a positive TOC. The first core portion 520*a* forms a spike running the length of a waveguide. In one embodiment the first core portion is formed on a lower cladding 512 over a substrate 510, similar to that of FIG. 1A. The first core portion may be deposited and then etched to form a spike having the desired dimensions. Support structures 524 may be formed on the lower cladding 512 as long as they are far enough away from the core 520 to prevent light from leaking from the core to the support structure.

FIG. 7B shows a negative TOC material deposited over the positive TOC first core portion 520*a* to form a second core portion 520*b*. The first core portion 520*a* and the second core portion 520*b* make up the core 520. In one embodiment, the negative TOC core material is a polymer ("core polymer"). In one embodiment, the core polymer is formed by spinning accumulation. Alternatively, the core polymer may be applied by other lithography methods. In one embodiment, the core polymer has a refractive index of approximately 1.45 to 1.6.

FIG. 7C shows a second negative TOC material deposited over the core 520 to form a cladding 530. In one embodiment, the negative TOC material is a polymer ("cladding polymer") and has a refractive index approximately 0.01 to 0.05 less than that of the core polymer 520*b*. In one embodiment, the core polymer and the cladding polymer are related polymers.

Figure 7D:
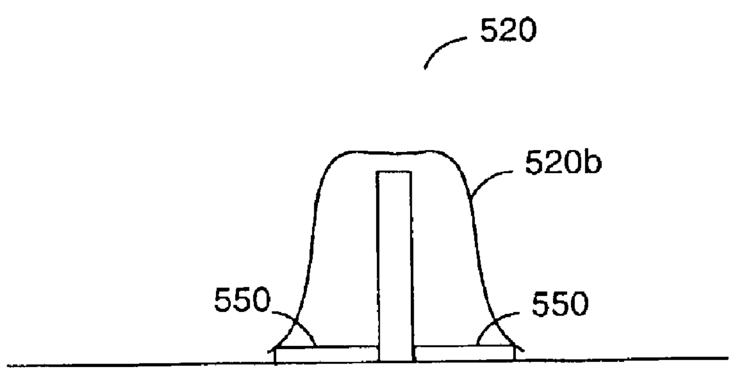
FIG. 7D is a schematic diagram showing an enlargement of the core of the waveguide of FIGS. 7A–7C.

FIG. 7D is a schematic diagram showing an enlargement of the core 520 of the waveguide 505 of FIGS. 7A–7C. In one embodiment, an undercladding 550 is deposited before applying the core polymer 520*a*. This provides an undercladding of polymer under the core, which creates an interface under the core that substantially matches the core/cladding interface on top of the core to provide better performance.

Figure 8:
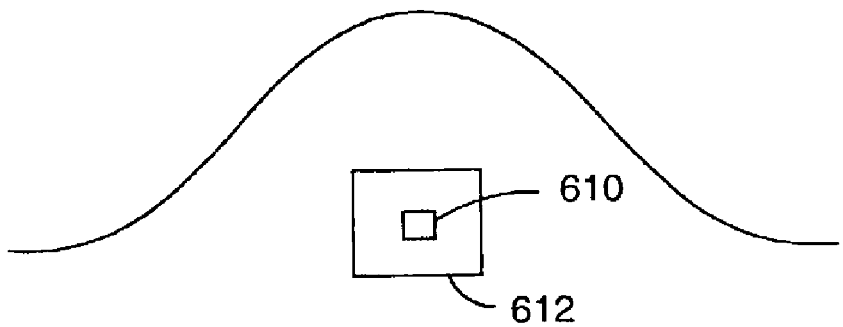
FIG. 8 is a schematic diagram showing a cross sectional view of another embodiment of a waveguide having a dual material core.

FIG. 8 is a schematic diagram showing a cross sectional view of another embodiment of a waveguide having a dual material core. In this embodiment, an inner core 610 is completely surrounded by an outer core 612. In one case, the inner core has a negative TOC and the outer core has a positive TOC. In an alternate embodiment, the inner core has a positive TOC and the outer core has a negative TOC. The inner and outer cores may comprise polymer or other suitable materials.

Figure 9:
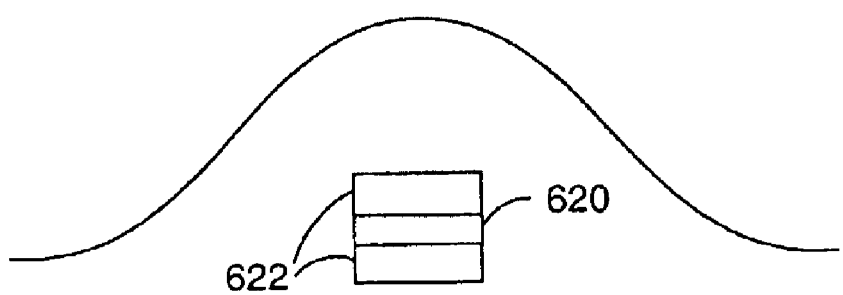
FIG. 9 is a schematic diagram showing a cross section view of another embodiment of a waveguide having a dual material core.

FIG. 9 is a schematic diagram showing a cross section view of another embodiment of a waveguide having a dual material core. In this embodiment, an inner core 620 is sandwiched between an outer core 622. The inner core, however, lies substantially in the plane of the substrate of the PLC, and will not have as good optical confinement for PLC's with significant bend radii compared to the structures previously described with respect to FIGS. 1C and 7C having inner cores in a plane substantially perpendicular to the plane of the substrate of the PLC.

Thus, an apparatus and method for making thermally-compensating planar lightwave circuit is disclosed. However, the specific embodiments and methods described herein are merely illustrative. For example, although the techniques for thermally compensating waveguides were described in terms of an SOS structure, the techniques are not limited to SOS structures. Numerous modifications in form and detail may be made without departing from the scope of the invention as claimed below. The invention is limited only by the scope of the appended claims.

What is claimed is:

1. A planar lightwave circuit comprising:

a first waveguide that is thermally-compensating, the first waveguide comprising a cladding; and a core substantially confined by the cladding, the core comprising first and second regions running lengthwise through the core, the first region having a positive thermo-optic coefficient, the second region having a negative thermo-optic coefficient, and wherein the first region runs substantially lengthwise through a central portion of the second region, wherein the planar lightwave circuit comprises an array waveguide grating.

2. The planar lightwave circuit of claim 1, wherein the first region comprises a polymer.

3. The planar lightwave circuit of claim 2, wherein the polymer comprises silicone, PMMA or BCB.

4. The planar lightwave circuit of claim 1, wherein the second region comprises doped silica.

5. The planar lightwave circuit of claim 1, wherein the first region forms an enclosed channel running through the central portion of the second region.

6. The planar lightwave circuit of claim 1, wherein the planar lightwave circuit comprises an interferometer.

7. The planar lightwave circuit of claim 6, wherein the planar lightwave circuit is a Mach Zehnder interferometer.

8. The planar lightwave circuit of claim 1, wherein the planar lightwave circuit comprises a coupler.

9. The planar lightwave guide circuit of claim 1, further comprising:

a second waveguide that is not thermally-compensating, the second waveguide comprising a core comprising a single material having a positive thermo-optic coefficient.

10. The planar lightwave circuit of claim 1, wherein the first waveguide is thermally-compensating over a range of approximately 100° C.

11. The planar lightwave circuit of claim 10, wherein the first waveguide has a bend radius down to greater than or equal to about 10 mm.

12. The planar lightwave circuit of claim 1, wherein the first region extends into the second region by at least two-thirds.

13. The planar lightwave circuit of claim 1, wherein the second region comprises a polymer.

14. The planar lightwave circuit of claim 1, said core comprising an inner core and an outer core wherein the width of the inner core is approximately 1 micron or less.

15. A planar lightwave circuit comprising:

an electrical component, wherein the electrical component is an electrical-to-optical converter or sit optical-to-electrical converter; and a waveguide coupled to the electrical component, the waveguide having a core capable of propagating an optical signal, the core comprising a first material and a second material, wherein the first material runs substantially through the center portion of the second material, and wherein the first material has a positive thermo-optic coefficient and the second material has a negative thermo-optic coefficient.

16. The planar lightwave circuit of claim 15, wherein the first material splits the core into two portions along a length of the core.

17. The planar lightwave circuit of claim 16, wherein the first material lies substantially in a plane parallel to a primary plane of the planar lightwave circuit.

18. The planar lightwave circuit of claim 16, wherein the first material lies substantially in a plane perpendicular to a primary plane of the planar lightwave circuit.

19. The planar lightwave circuit of claim 15, wherein the first material comprises polymer.

20. The planar lightwave circuit of claim 19, wherein the second material comprises doped silica.

21. The planar lightwave circuit of claim 19, wherein the second material comprises a polymer.

22. The planar lightwave circuit of claim 15, wherein the electrical component is a temperature regulator.

23. A method of guiding an optical signal through a planar waveguide, wherein the optical signal has an optical field, the method comprising:

guiding a first portion of the optical filed in a first material;

guiding a second portion of the optical field in a second material, wherein the first material and the second material comprise a core of the planar waveguide, and wherein the first material has a negative thermo-optic coefficient and the second material has a positive thermo-optic coefficient, and wherein the second material is substantially surrounded by the first material.

24. The method of claim 23, wherein the first portion of the optical field and the second portion of the optical field are substantially concentric.

25. The method of claim 23, wherein the second portion of the optical field is guided within the first portion of the optical field.

* * * * *